(12) United States Patent
Tanaka

(10) Patent No.: US 9,374,658 B2
(45) Date of Patent: Jun. 21, 2016

(54) DIGITAL IMAGE VIEWING SYSTEM, A CELLAR PHONE AND A DIGITAL PHOTO FRAME

(71) Applicant: Masahide Tanaka, Osaka (JP)

(72) Inventor: Masahide Tanaka, Osaka (JP)

(73) Assignee: NL GIKEN INCORPORATED, Osaka (JP)

(*) Notice: Subject to any disclaimer, the term of this patent is extended or adjusted under 35 U.S.C. 154(b) by 0 days.

(21) Appl. No.: 14/681,113

(22) Filed: Apr. 8, 2015

(65) Prior Publication Data

US 2015/0215727 A1 Jul. 30, 2015

Related U.S. Application Data

(63) Continuation of application No. 12/748,379, filed on Mar. 27, 2010, now Pat. No. 8,024,956.

(30) Foreign Application Priority Data

Mar. 29, 2009 (JP) ................................ 2009-080745

(51) Int. Cl.
*H04B 7/00* (2006.01)
*H04W 4/00* (2009.01)
*H04M 1/725* (2006.01)
*H04N 1/00* (2006.01)

(52) U.S. Cl.
CPC ............ *H04W 4/008* (2013.01); *H04M 1/7253* (2013.01); *H04N 1/00307* (2013.01); *G09G 2380/16* (2013.01); *H04M 1/72552* (2013.01)

(58) Field of Classification Search
CPC ... G06F 3/147; G06F 3/0482; G09G 2380/16; G09G 2354/00; G09G 2320/06; G09G 2370/16; G09G 5/363; H04M 1/27455; H04M 1/7253; H04M 1/72547; H04M 1/72555; H04M 1/72544; H04M 1/72552
USPC .......... 455/41.3; 345/205, 531, 533, 545, 1.2, 345/2.1–2.3; 710/300–304
See application file for complete search history.

(56) References Cited

U.S. PATENT DOCUMENTS

| | | | | |
|---|---|---|---|---|
| 6,118,856 | A * | 9/2000 | Paarsmarkt et al. | 379/93.24 |
| 2007/0164980 | A1* | 7/2007 | Manning | 345/104 |
| 2007/0299850 | A1* | 12/2007 | Qian | 707/10 |
| 2008/0189766 | A1* | 8/2008 | Bell et al. | 726/3 |
| 2009/0163137 | A1* | 6/2009 | Capparelli | H04H 60/06 455/3.06 |
| 2009/0278769 | A1* | 11/2009 | Huang | 345/76 |
| 2009/0313582 | A1* | 12/2009 | Rupsingh et al. | 715/835 |
| 2009/0318194 | A1* | 12/2009 | Alberth, Jr. et al. | 455/566 |
| 2010/0171805 | A1* | 7/2010 | Ron et al. | 348/14.02 |
| 2010/0174801 | A1* | 7/2010 | Tabaaloute | 709/217 |
| 2010/0184372 | A1* | 7/2010 | Tabaaloute | 455/41.1 |
| 2012/0198504 | A1* | 8/2012 | Tabaaloute | H04L 12/2809 725/81 |

* cited by examiner

Primary Examiner — Allahyar Kasraian

(57) ABSTRACT

A digital image viewing system comprises a wireless phone unit, a battery charger for the wireless phone unit and a digital photo frame in short-range wireless communication with the wireless phone unit. The digital photo frame may include phone function unit. Usual slide show is played on display of digital photo frame and replaced by a special image when a speaker of digital photo frame plays a ringer melody. The special image relates to a person causing the ringer melody. An operation at the wireless phone unit is transmitted to the digital photo frame through the short-range wireless communication to change the special image back to the usual slide show. Upon receipt of e-mail with image data attached, cellar phone automatically but conditionally opens the e-mail and takes out the image data to transmit it to digital photo frame through the short-range wireless communication or direct contact with battery charger.

13 Claims, 10 Drawing Sheets

DIGITAL IMAGE VIEWING SYSTEM, A CELLAR PHONE AND A DIGITAL PHOTO FRAME

CROSS REFERENCE TO RELATED APPLICATION

This application is a Continuation Application of U.S. application Ser. No. 12/748,379 filed Mar. 27, 2010 herein incorporated by reference in its entirety.

BACKGROUND OF THE INVENTION

1. Field of the Invention

This invention relates to a digital image viewing system, such as digital photo frame.

2. Description of the Related Art

In this field of art, various digital image viewing systems have been proposed for enjoying digital images taken by digital camera or the like. A typical example of the digital image viewing system is a digital photo frame. As to digital photo frame, various proposals have made such as in Japanese Laid-open Patent Application 2008-236395.

However, there still remains a demand in this field of art to improve the digital image viewing system.

SUMMARY OF THE INVENTION

An object of this invention is to provide a digital image viewing system easy to enjoy.

Another object of this invention is to provide a cellar phone incorporated into a digital image viewing system.

Still another object of this invention is to provide an improved digital photo frame.

To achieve one of the above objects, this invention provides a digital image viewing system comprising a wireless phone unit, a battery charger for the wireless phone unit and a digital photo frame in wireless communication with the wireless phone unit. The wireless phone unit in the system includes a phone short-range wireless communicator, an operating portion, a phone display cooperating with the operating portion for operations and displays relating to various phone functions, and a rechargeable battery to power the wireless phone unit. The battery charger in the system is arranged to charge the rechargeable battery of the wireless phone unit. And, the digital photo frame includes a memory arranged to store digital image data, a photo frame display, a controller arranged to play usual slide show on the display on the basis of the digital image data stored in the memory, and a photo frame short-range wireless communicator in communication with the phone short-range wireless communicator to change the image display on the photo frame display.

According to the image viewing system above, the digital photo frame is capable of playing slide show of digital image on the display and cooperating with phone function for changing the image display on the display.

According to a detailed feature of this invention, the digital photo frame further includes a speaker, wherein the controller of the digital photo frame is arranged to replace the usual slide show with a special image when the speaker plays a ringer melody on the speaker. In this case, the user can know the incoming on the phone function with information of the change in the image display added. According to a further detailed feature of this invention, the controller of the digital photo frame is further arranged to superimpose a message on the special image when the speaker plays the ringer melody. According to another detailed feature of this invention the controller of the digital photo frame is further arranged to have the usual slide show accompanied by background music played on the speaker and to stop the background music when the speaker plays the ringer melody. According to still another detailed feature of this invention, the special image is relating to the ringer melody in such a manner that the special image is relating to a person causing the ringer melody, for example.

According to another detailed feature of this invention, the phone short-range communicator is arranged to transmit an operation at the operating portion to the digital photo frame by way of the photo frame short-range wireless communicator to change the display on the photo frame. In this case, for example, the automatic change in image display from usual slide show to the special image can be manually changed back to the usual slide show by means of an operation at the wireless phone unit.

According to still another detailed feature of this invention, the digital photo frame further includes a phone function unit. Or, alternatively, the wireless phone unit further includes a phone function unit. In any case, the features relating to the cooperation between the digital photo frame function and phone function mentioned above can be achieved.

A typical example of wireless phone unit including the phone function unit is a cellar phone. Focusing to such a case, this invention provides a cellar phone comprising a phone function unit capable of receiving an e-mail with digital image data is attached, a controller arranged to automatically open the e-mail and automatically take out the attached digital image data, and a transmitter arranged to automatically transmit the taken out digital image data to outside of the cellar phone. According to this feature, the digital image transmitted to the cellar phone in the form of e-mail is easily enjoyed in outside of the cellar phone, such as in digital photo frame. In a detailed feature, the transmitter includes a short-range wireless communicator. Or, alternatively, the transmitter includes a communication contact. Further, the transmitter may include both.

According to another detailed feature of the above cellar phone, the controller is arranged to automatically open the e-mail and automatically take out the attached digital image data with a predetermined condition met. This is advantageous to avoid confusion or breach of privacy, which may be otherwise caused by automatically opening the e-mail and automatically taking out the digital image data to transmit it outside. The simplest example of the condition is whether or not the e-mail is accompanied by digital image data. Another example of the condition is whether or not the digital image data is of open-sourced in which the sender of the digital image data has allowed the receiver to display the digital image. Still another example of the condition is whether or not any IP address of outside viewer such as digital photo frame is registered as the destination of the digital image data. Further example of the condition is whether or not the short-range communication is possible in wireless case. Or, in the contact communication case, an example of the condition is whether or not the cellar phone is mounted on battery charger or the like.

According to another feature of this invention such a digital photo frame is provided that the digital photo frame comprises a memory arranged to store digital image data, a photo frame display, a receiver arranged to receive digital image data from outside of the digital photo frame, a controller arranged to play usual slide show on the display on the basis of the digital image data stored in the memory and to replace the usual slide show with a special image when the receiver receives digital image data from outside of the digital photo frame.

According to a detailed feature of the above digital photo frame, the receiver includes a short-range wireless communicator. Or, alternatively, the receiver includes a communication contact. Further, the receiver may include both.

According to another detailed feature, the digital photo frame above further comprises a speaker, wherein the controller is arranged to replace the usual slide show with the special image accompanied by a ringer melody played on the speaker.

According to a still another detailed feature of the above digital photo frame, the controller is further arranged to superimpose a message on the special image when the receiver receives digital image data from outside of the digital photo frame.

As another detailed feature, the above digital photo frame may further comprises a phone function unit.

Other features and advantages according to this invention will be readily understood from the detailed description of the preferred embodiment in conjunction with the accompanying drawings.

The detailed description of the preferred embodiment according to this invention includes various detailed features derived from the above mentioned features. However, such detailed features are not only applicable to the above mentioned features, but also are widely and independently applicable to other objects and features. So, the above description should not be deemed to limit the scope of this invention, which should be properly determined on the basis of the attached claims.

DETAILED DESCRIPTION OF THE PREFERRED EMBODIMENT

Embodiment 1

Figure 1:
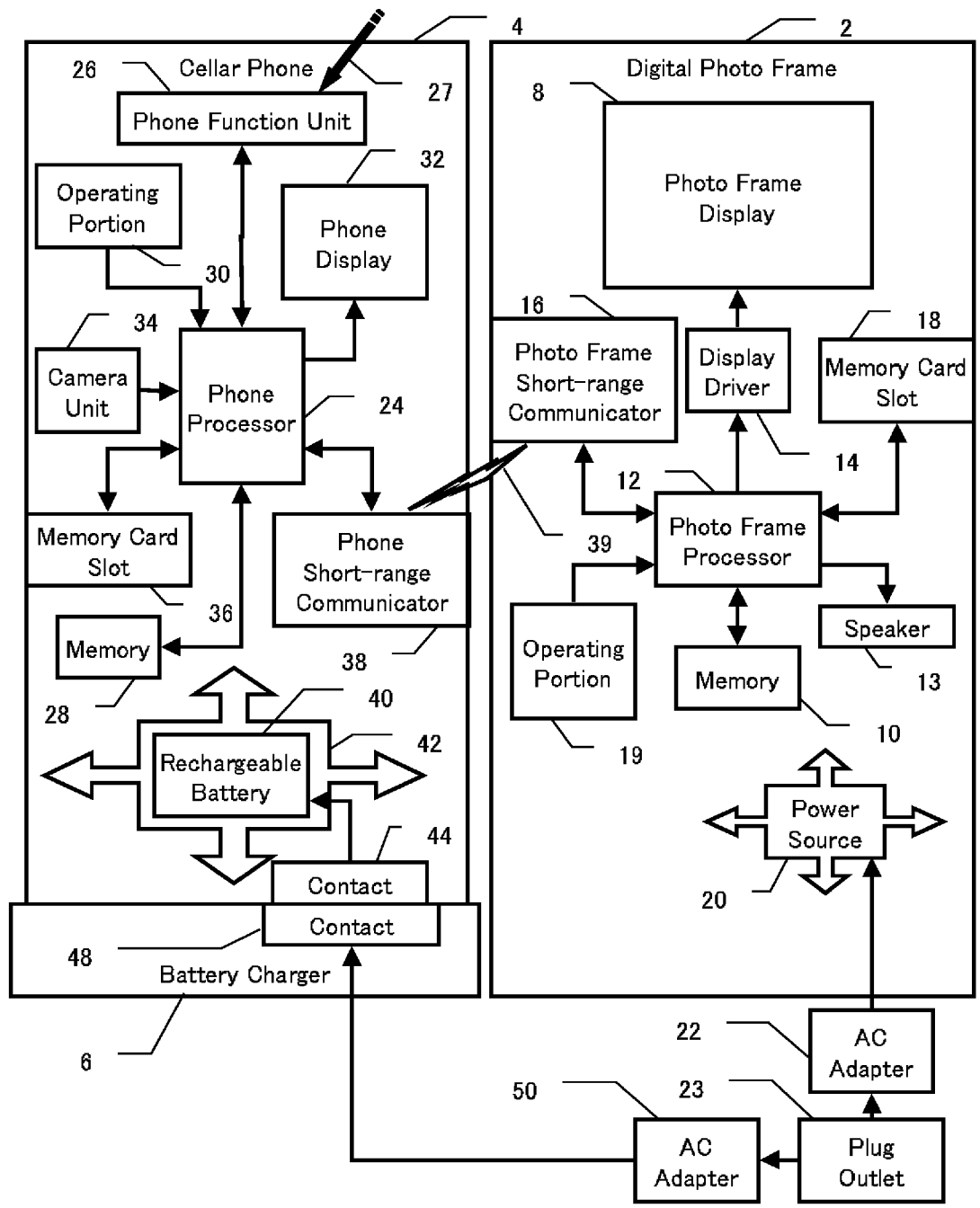
FIG. 1 is a block diagram showing the first embodiment of a digital image viewing system according to this invention.

FIG. 1 is a block diagram showing the first embodiment of a digital image viewing system including digital photo frame 2, cellar phone 4 and battery charger 6. Digital photo frame 2 includes photo frame display 8 for displaying digital image under control of photo frame processor 12 on the basis of image data stored in memory 10. Memory 10 is for further storing computer programs executed by photo frame processor 12 and also for storing various temporary data necessary for photo frame processor 12 to execute its function. According to the computer programs stored in memory 10, photo frame processor 12 retrieves new image data stored in memory 10 to replace digital image on photo frame display 8 by means of display driver 14.

Image data to be stored in memory 10 can be received from cellar phone 4 by way of photo frame short-range wireless communicator 16 such as Wireless Local Area Network (WLAN) or "Bluetooth". Photo frame short-range wireless communicator 16 can also receive image data from a digital camera or the like for the storage in memory 10. Photo frame processor 12 can also retrieves new image data directly from a removable storage medium inserted into memory card slot 18 to replace digital image on photo frame display 8. Or, the image data in the removable storage medium inserted into memory card slot 18 can be once loaded into memory 10, and then retrieved from memory 10 for display on photo frame display 8.

In response to a report from photo frame short-range wireless communicator 16 that it receives new digital image data, photo frame processor 12 directs display driver 14 to superimpose a message such as "New!" onto the image display, and replace the existing image slide show by the newly received image. If multiple images are newly received, a new slid show begins at that time. The details of these functions will be explained later. Further, upon receiving the new image or images, photo frame processor 12 replaces the usual background music for the existing image slide show by predetermined special background music for the new slide show for informing of the receipt of new image or images. The sound source of background music is stored in memory 10 for playing over speaker 13. The slide show of the new image or images accompanied with the special music continues until the predetermined operation made at operating portion 19.

Operating portion 19 includes a direct manual controller such as operation buttons as well as an infrared communicator for receiving infrared remote control signal. Such an infrared communicator is capable of receiving infrared remote control signal from cellar phone 4. In this case, digital photo frame 2 with photo frame display 8 serves as a larger screen digital image viewing unit under the remote control by cellar phone 4 for viewing image taken by cellar phone 4. Power source 20 for entire digital photo frame 2 supplies various portions of digital photo frame 2 with various voltages of power required, respectively. Power source 20 is connected to plug outlet 23 through AC adapter 22.

With respect to cellar phone 4, on the other hand, phone processor 24 controls entire cellar phone 4, including phone function unit 26, in accordance with computer programs stored in memory 28. Operating portion 30 and phone display 32 are for operations and displays relating to various functions of phone function unit 26, respectively. Camera unit 34 is capable of taking pictures in the camera mode of cellar phone 4 to store digital image data of the taken pictures into memory 28 or a storage medium in memory card slot 36. The storage medium is removable from memory card slot 36 for insertion into memory card slot 18 of digital photo frame 2. Thus, the digital image taken by cellar phone 4 and stored in the removable storage medium can be displayed on photo frame display 8 of digital photo frame 2 by means of the conveyance of the removable storage medium from memory card slot 36 to memory card slot 18.

Cellar phone 4 is capable of transmitting and receiving digital image data to and from other cellar phones or digital image servers by means of attaching the digital image data to e-mail to be transmitted through the function of phone function unit 26. Black thick arrow 27 denotes radio wave arrival to phone function unit 26 according to the cellar phone system. If E-mail with digital image data attached is received by cellar phone 4 through phone function unit 26, the received e-mail is automatically opened under a predetermined condition to automatically transmit the attached digital image data from phone short-range wireless communicator 38 to photo frame short-range wireless communicator 16 as denoted by arrow of lightning 39. The details of these functions will be explained later. A typical example of the above mentioned condition for automatic open of e-mail is that cellar phone 4 is mounted on battery charger 6 and also is located within the communication range of photo frame short-range wireless communicator 16. The digital image data transmitted by phone short-range wireless communicator 38 is received by photo frame short-range wireless communicator as a new image and displayed on photo frame display 8 in the manner described above. Thus, if E-mail with digital image data attached is newly received by cellar phone 4, the attached digital image data is automatically displayed by digital photo frame 2 on photo frame display 8 under a predetermined condition.

Power source 42 for entire cellar phone 4 supplies various portions of cellar phone 2 with various voltages of power required, respectively. Power source 42 relies its function on rechargeable battery 40 which is connectable to plug outlet 23 through AC adapter 50 when cellar phone 4 is mounted on battery charger 6 to establish the contact between contact 44 on the cellar phone side and contact 48 on the battery charger side. As will be mentioned later, such a modification is possible that cellar phone 4 automatically opens the new e-mail upon its arrival to automatically transmit the attached digital image data to digital photo frame from phone short-range wireless communicator 38 if possible regardless of whether or not cellar phone 4 is mounted on battery charger 6. According to the first embodiment of this invention above, the advantages of this invention can be achieved with less modification to the conventional cellar phone and conventional digital photo frame.

Figure 2:
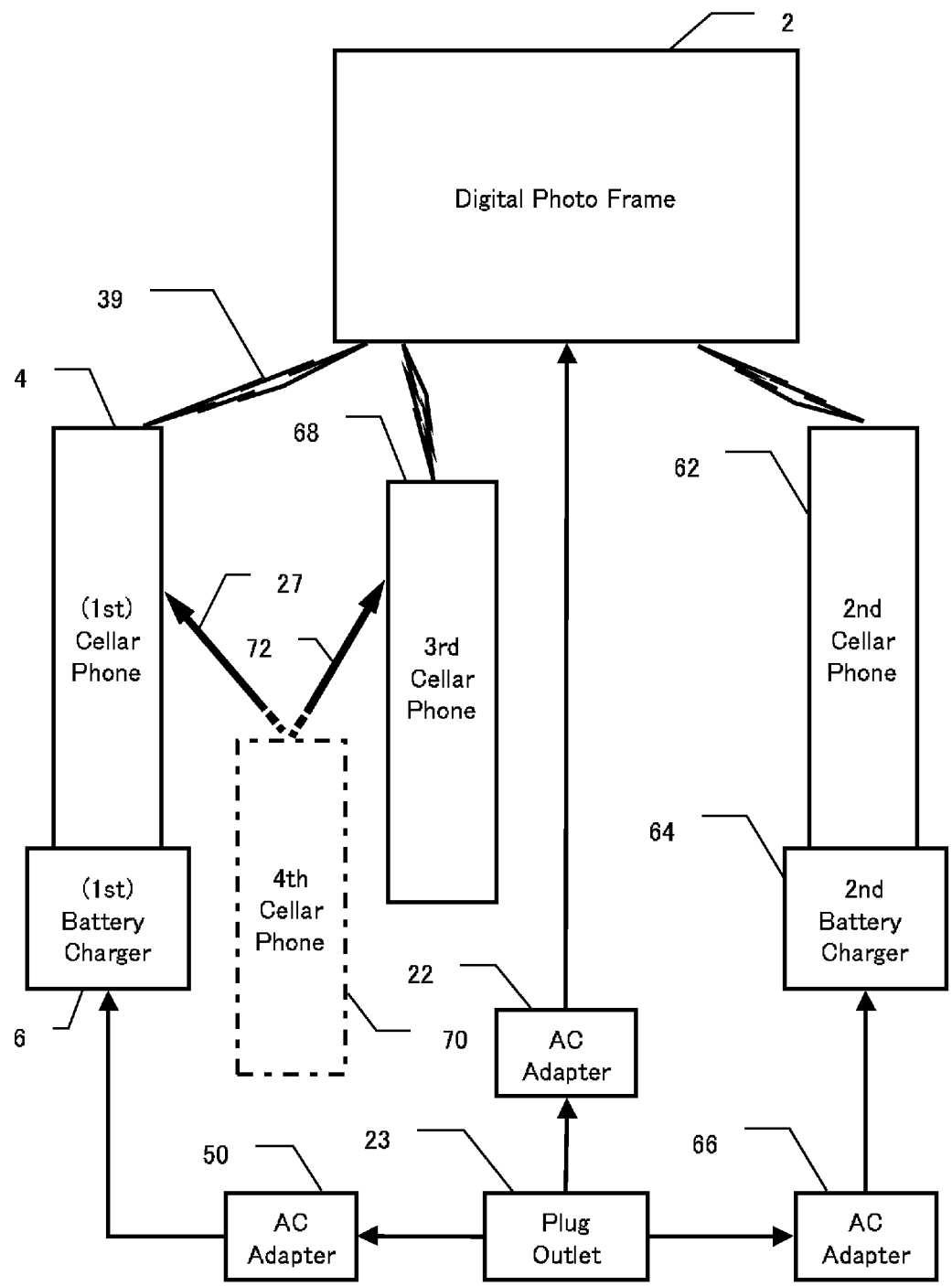
FIG. 2 is a system block diagram showing such a case that a plurality of cellar phones are located within the communication range of photo frame short-range wireless communicator according to the first embodiment in FIG. 1.

FIG. 2 is a system block diagram showing such a case that a plurality of cellar phones are located within the communication range of photo frame short-range wireless communicator 16 according to the first embodiment in FIG. 1. In FIG. 2, same reference number is used as in FIG. 1 to denote the same part common to the both figures with detailed substructures shown in FIG. 1 omitted in FIG. 2. In the case of FIG. 2, in addition to cellar phone 4 which is first mentioned, second cellar phone 62 within the range of short-range wireless communication with digital photo frame 2 is mounted on second battery charger 64, which is powered through AC adapter 66. Further, third cellar phone 68 apart from its battery charger is located on a desk or the like also within the range of short-range communication with digital photo frame 2.

First cellar phone 4 and third cellar phone 68 both have received the same e-mail from forth cellar phone 70 in the long distance by way of radio waves 27 and 72 according to the cellar phone system, respectively. For example, fourth cellar phone 70 is of a daughter living far off her parents, cellar phone 4 of her father, and cellar phone 62 of her mother, wherein photos of a grandson of the parents are attached to the e-mail from cellar phone 70. It is needless to say that radio waves 27 and 72 come by way of base stations in the cellar phone system although they are symbolically shown in FIG. 2 as if they come directly form fourth cellar phone 70 to first cellar phone 4 and second cellar phone 62, respectively.

The same e-mails received by first cellar phone 4 and third cellar phone 68 are automatically opened, respectively. And, the attached digital image data, which corresponds to the photos of the grandson from the daughter, are automatically transmitted to digital photo frame 2 through the short-range communication, respectively. In such a case, digital photo frame 2 receives the digital image transmission in order of receipt. In other word, during the receiving procedure of the first-come digital image data, the commencement of receiving the second-come digital image data is postponed. Further, if the second-come digital image data from one of first cellar phone 4 and third cellar phone 68 is identical with the first-come digital image data from the other because of the same image data from fourth cellar phone 70 received by both first cellar phone 4 and third cellar phone 68, digital photo frame 2 eliminate the second-come digital image data form the arrival slide show for avoiding redundant duplication. The duplication is detected in digital photo frame 70 by means of comparison between ID's of the digital image data from first cellar phone 4 and third cellar phone 68, which are identical if the original is the same.

Figure 3:
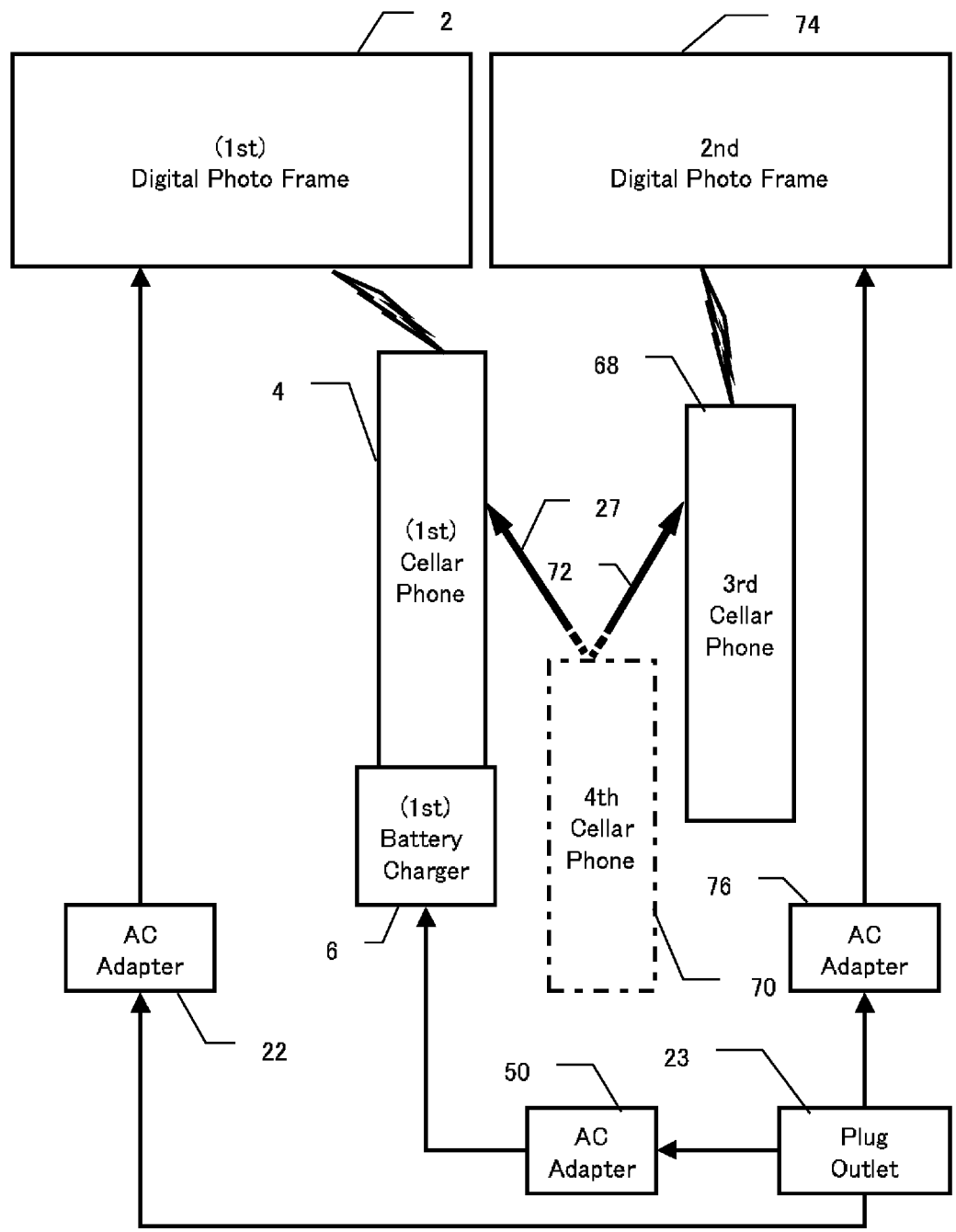
FIG. 3 is a system block diagram showing such a case that a plurality of digital photo frames are located with there communication ranges of respective short-rang communicators overlapping, within which a plurality of cellar phones exist, according to the first embodiment in FIG. 1.

FIG. 3 is a system block diagram showing such a case that a plurality of digital photo frames are located with there communication ranges of respective short-rang communicators overlapping, within which a plurality of cellar phones exist, according to the first embodiment in FIG. 1. In FIG. 3, same reference number is used as in FIGS. 1 and 2 to denote the same part common to the figures with detailed substructures shown in FIGS. 1 and 2 omitted in FIG. 3. Further, second cellar phone 62 shown in FIG. 2 is omitted in FIG. 3. In the case of FIG. 3, third cellar phone 68 automatically opens the email received from fourth cellar phone 70 to automatically transmit the attached digital image data to second digital photo frame 74 by means of short-range communication. The second digital photo frame 74 is powered by plug outlet 23 by way of AC adapter 76. First digital photo frame 2 and second digital photo frame 74 are each allotted IP addresses for short-range communication, respectively. The IP address of first digital photo frame 2 is registered by first cellar phone 4 and the IP address of second digital photo frame 74 by third cellar phone 68 to identify the destinations of the digital image data transmission, respectively. In the case of FIG. 3, first digital photo frame 2 and second digital photo frame 74 each independently present their slide shows on the basis of the same digital image data from first cellar phone 4 and third cellar phone 68, respectively, even if they are both originated from fourth cellar phone 70.

Embodiment 2

Figure 4:
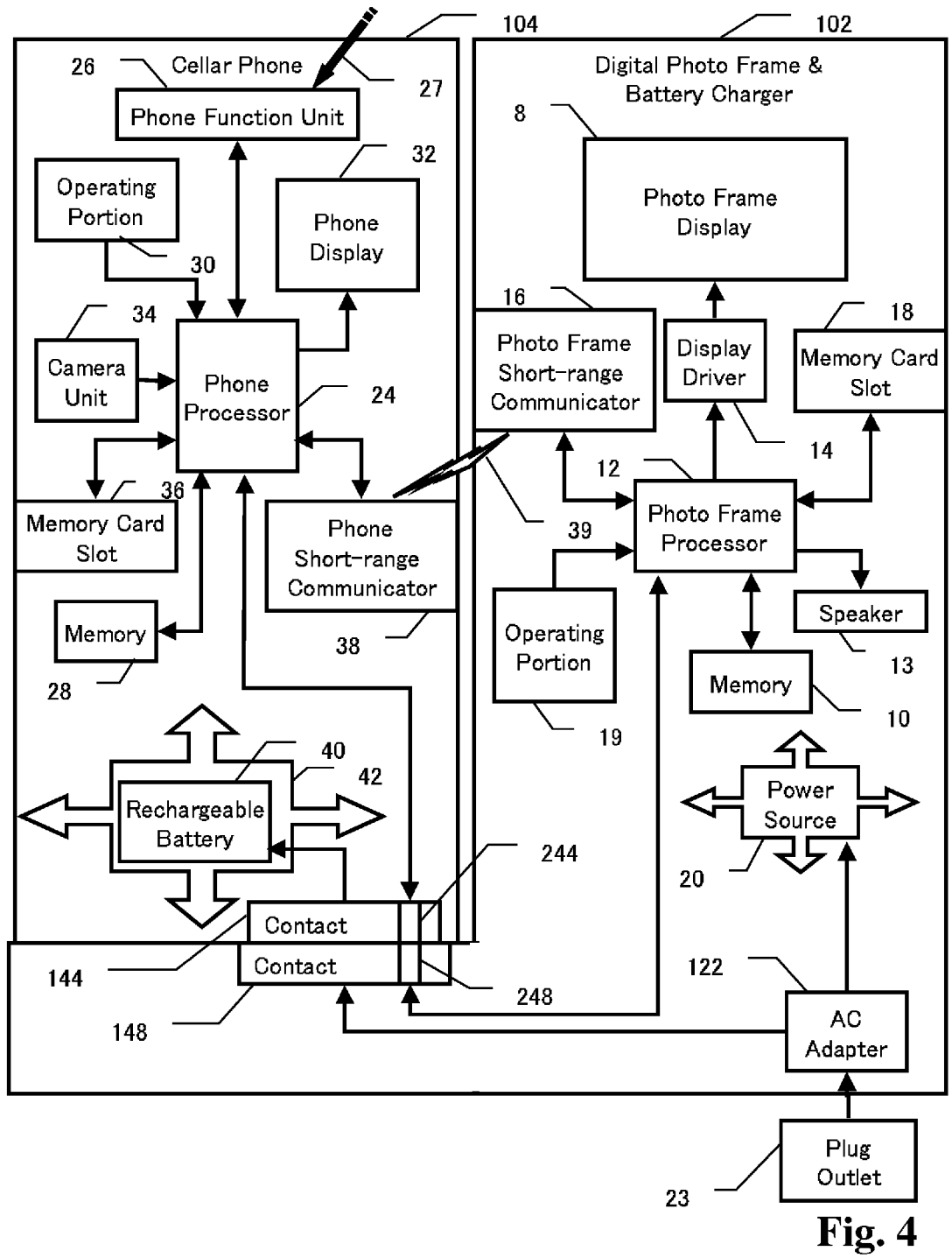
FIG. 4 is a block diagram showing the second embodiment of a digital image viewing system according to this invention.

FIG. 4 is a block diagram showing the second embodiment of a digital image viewing system according to this invention. Since the structure of the second embodiment in FIG. 4 is basically similar to that of the first embodiment in FIG. 1, same reference number is used to denote the same part common to both figures with explanation thereof basically omitted. The second embodiment in FIG. 4 includes cellar phone 104 and digital photo frame 102 also serving as battery charger for cellar phone 104. Thus, the second embodiment in FIG. 4 firstly differs from the first embodiment in FIG. 1 in that the digital photo frame and the battery charger are integrated into one body.

The second point that the second embodiment in FIG. 4 differs from the first embodiment in FIG. 1 is that cellar phone 104 can automatically transmit the digital image data attached to the automatically opened e-mail by way of wired communication through the contact between contacts 144 and 148 when the e-mail is received with cellar phone 104 mounted on digital photo frame and battery charger 102. In the second embodiment, phone short-range wireless communicator 38 in addition to the wired communication through contact 144 is useful in such a case that cellar phone 104 is not mounted on digital photo frame and battery charger 102 but is located within the communication range of photo frame short-range wireless communicator 16. However, such a simplified modification of the second embodiment may be possible that the second point is omitted by means of carrying out the automatic digital image data transmission only through the short-range wireless communication between communicators 16 and 38 as in the first embodiment. In other words, the simplified second embodiment is characterized by the integration of digital photo frame for cellar phone and battery charger also for cellar phone.

In more detail with respect to the wired communication for transmitting the digital image data, digital photo frame and batter charger 102 on which cellar phone 104 is mounted includes contact 148 having communication contact 248 in addition to the power supply contact for charging. Correspondingly, cellar phone 104 includes contact 144 having communication contact 244 in addition to the power receiving contact for charging. Thus, digital image data attached to the e-mail received by cellar phone 104 is transmitted from phone processor 24 to photo frame processor 12 by way of communication contacts 244 and 248. AC adapter 122 supplies power source 20 and charging contact 148 of digital photo frame and battery charger 102 with necessary powers, respectively.

According to the second embodiment, wired path for transmitting digital image data is prepared for a new arrival of e-mail with digital image data attached only by mounting cellar phone 104 on digital photo frame and battery charger 102 for the purpose of charging rechargeable battery 40. This feature of adding communication contacts 244 and 248 to power contacts 144 and 148, respectively, is very simple and advantageous even in a case that at least one of cellar phone 104 and digital photo frame and battery charger 102 is designed to have no short-range wireless communicator for the purpose of cost-cutting. In other words, the simple structure of adding communication contacts 244 and 248 achieves the advantageous feature that the digital image data attached to e-mail received by cellar phone 104 is automatically displayed on photo frame display 8 upon the arrival of the e-mail. Further, in the case that cellar phone 104 apart from digital photo frame 102 has received a number of e-mails with digital image data attached, respectively, the e-mails are automatically and collectively opened and all the new digital image data attached thereto are automatically and collectively transmitted to digital photo frame and battery charger 102 through communication contacts 244 and 248 once cellar phone 104 is mounted on digital photo frame and battery charger 102 for charging rechargeable battery 40. Thus, in the second embodiment, digital image data received by cellar phone 104 by e-mail is automatically displayed on photo frame display 8 only by the mounting of cellar phone 104 on digital photo frame and battery charger 102 without any special operation.

Figure 5:
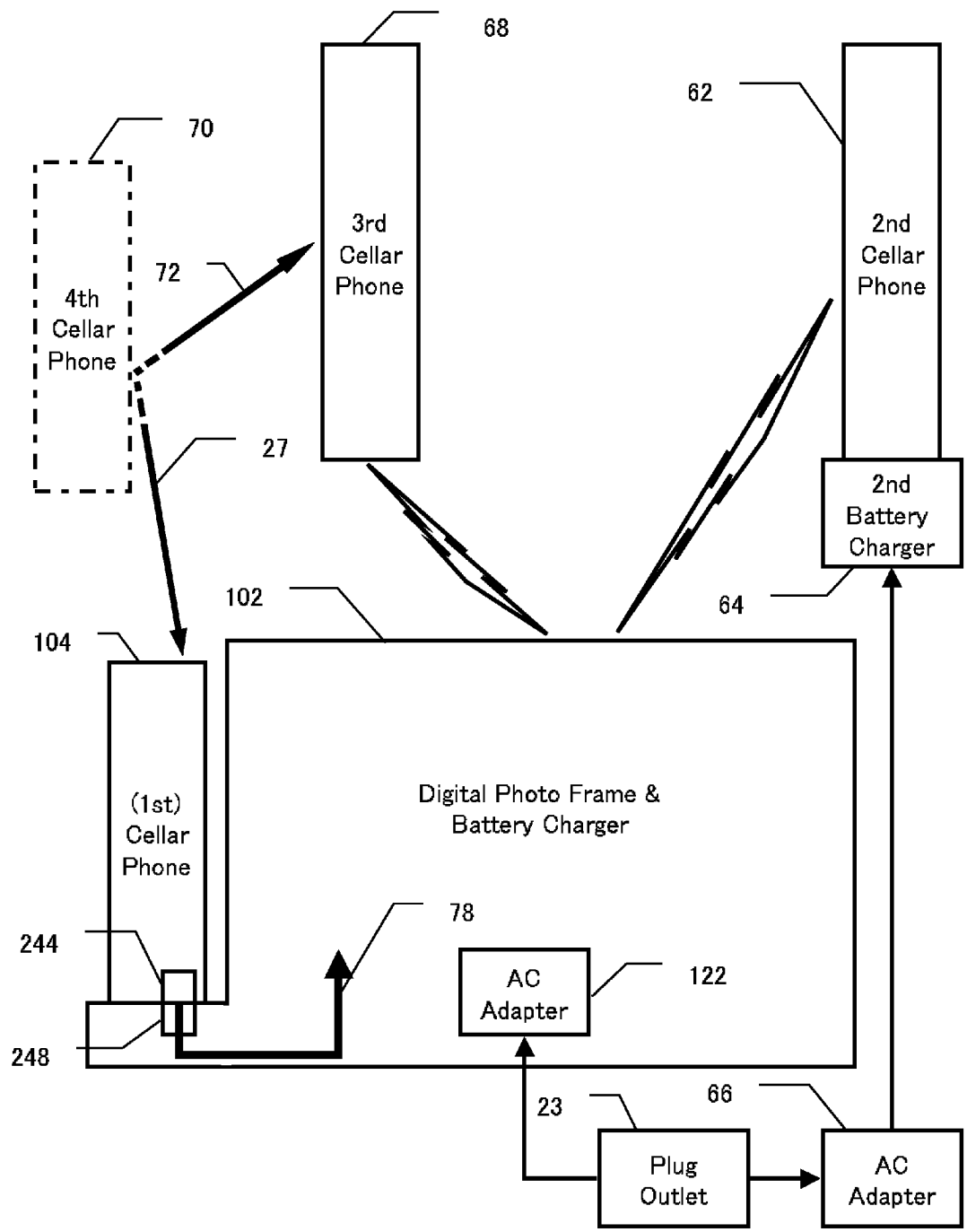
FIG. 5 is a system block diagram showing such a case that a plurality of cellar phones are located within the communication range of photo frame short-range wireless communicator according to the second embodiment in FIG. 4.

FIG. 5 is a system block diagram showing such a case that a plurality of cellar phones are located within the communication range of photo frame short-range wireless communicator 16 according to the second embodiment in FIG. 4. Also in FIG. 5, same reference number is used as in FIG. 4 to denote the same part common to the both figures with detailed substructures shown in FIG. 4 omitted in FIG. 5. In the case of FIG. 5, in addition to cellar phone 104 which is first mentioned, second cellar phone 62 within the range of short-range wireless communication with digital photo frame 2 is mounted on second battery charger 64, which is powered through AC adapter 66. Further, third cellar phone 68 apart from its battery charger is located on a desk or the like also within the range of short-range communication with digital photo frame and battery charger 102.

Similar to the case of FIG. 2, first cellar phone 104 and third cellar phone 68 both have received the same e-mail from forth cellar phone 70 in the long distance by way of radio waves 27 and 72 according to the cellar phone system, respectively. The same e-mails received by first cellar phone 104 and third cellar phone 68 are automatically opened to take out the attached digital image data, respectively. The digital image data taken out in first cellar phone 104 is automatically transmitted to digital photo frame and battery charger 102 by means of wired communication through communication contacts 244 and 248. Thick arrow 78 denotes the wired transmission above. On the other hand, the digital image data taken out in third cellar phone 68 is automatically transmitted to digital photo frame and battery charger 102 through the short-range communication as in the case of FIG. 2. Similar to the case of FIG. 2, digital photo frame and battery charger 102 receives the digital image transmission in order of receipt, in which the commencement of receiving the second-come digital image data is postponed during the receiving procedure of the first-come digital image data. Further, if the second-come digital image data from one of first cellar phone 104 and third cellar phone 68 is identical with the first-come digital image data from the other, digital photo frame and battery charger 102 eliminate the second-come digital image data form the arrival slide show for avoiding redundant duplication.

Figure 6:
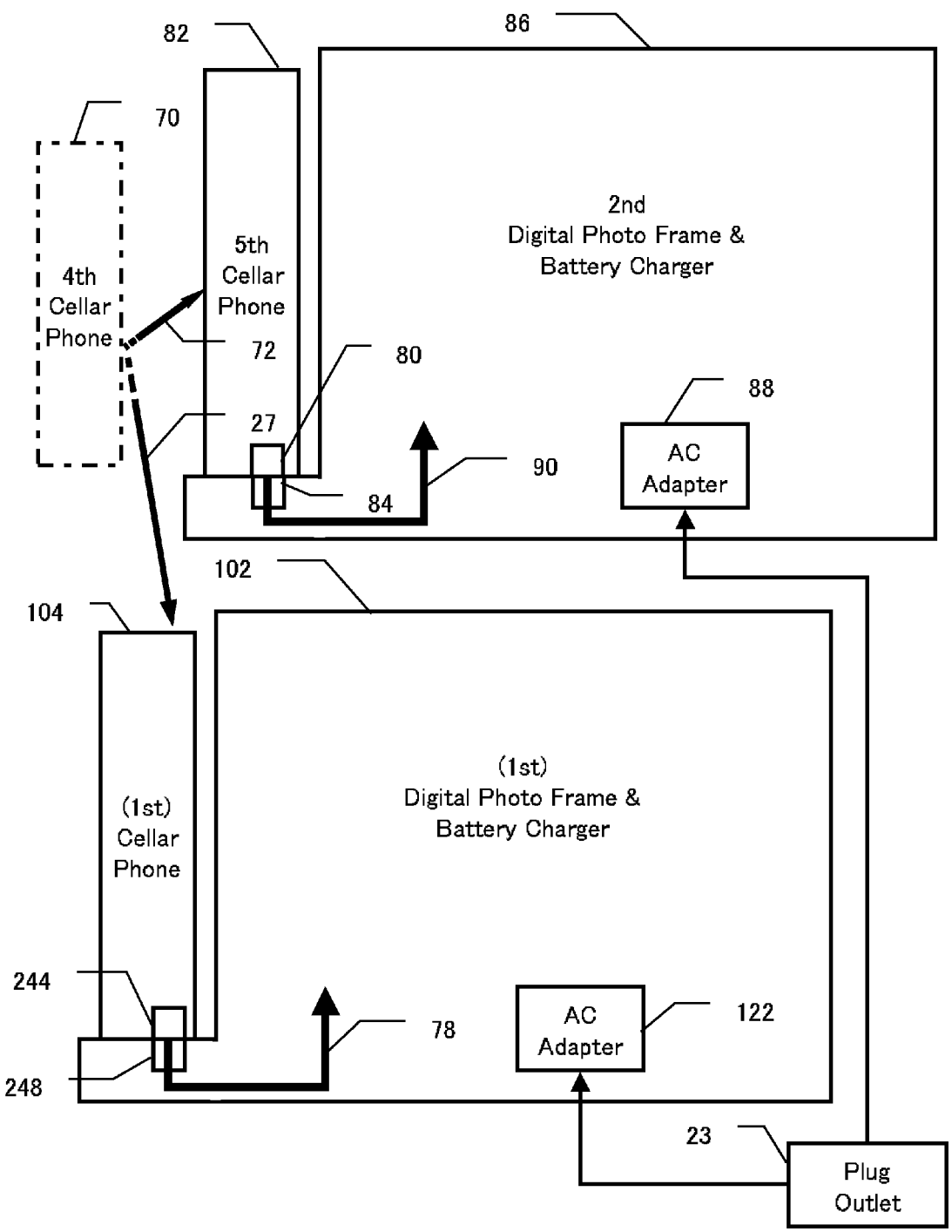
FIG. 6 is a system block diagram showing such a case that a plurality of digital photo frames and battery chargers exist in the system according to the second embodiment in FIG. 4.

FIG. 6 is a system block diagram showing such a case that a plurality of digital photo frames and battery chargers exist in the system according to the second embodiment in FIG. 4. In FIG. 6, same reference number is used as in FIGS. 4 and 5 to denote the same part common to the figures with detailed substructures shown in FIG. 4 omitted in FIG. 6. Further, another cellar phone such as denoted by 62 in FIG. 5 is omitted in FIG. 6. Alternatively, fifth cellar phone 82 of the similar structure to that in first cellar phone 104 is shown with communication contact 80. Correspondingly, second digital photo frame and battery charger 86 of the similar structure to that in first digital photo frame and battery charger 102 is shown with communication contact 84 and AC adapter 88, fifth cellar phone 82 being mounted on second digital photo frame and battery charger 86 for both charging its rechargeable battery and transmitting digital image data as in first digital photo frame and battery charger 102.

As in the case of FIG. 5, first cellar phone 104 and fifth cellar phone 82 both have received the same e-mail from forth cellar phone 70 in the long distance by way of radio waves 27 and 72 according to the cellar phone system, respectively. The same e-mails received by first cellar phone 104 and fifth cellar phone 82 are automatically opened to take out the attached digital image data, respectively. The digital image data taken out in first cellar phone 104 and firth cellar phone 82 are automatically transmitted to first digital photo frame and battery charger 102 and second digital photo frame and battery charger 86 by means of wired communication through the pair of communication contacts 244 and 248 and the pair of communication contacts 80 and 84, respectively. Thick arrow 90 denotes the wired transmission in second digital photo frame and battery charger 86 as in thick arrow 78 for first digital photo frame and battery charger 102. In the case of FIG. 6 similar to that in FIG. 3, first digital photo frame and battery charger 102 and second digital photo frame and battery charger 86 each independently present their slide shows on the basis of the same digital image data from first cellar phone 104 and fifth cellar phone 82, respectively, even if they are both originated from fourth cellar phone 70.

Embodiment 3

Figure 7:
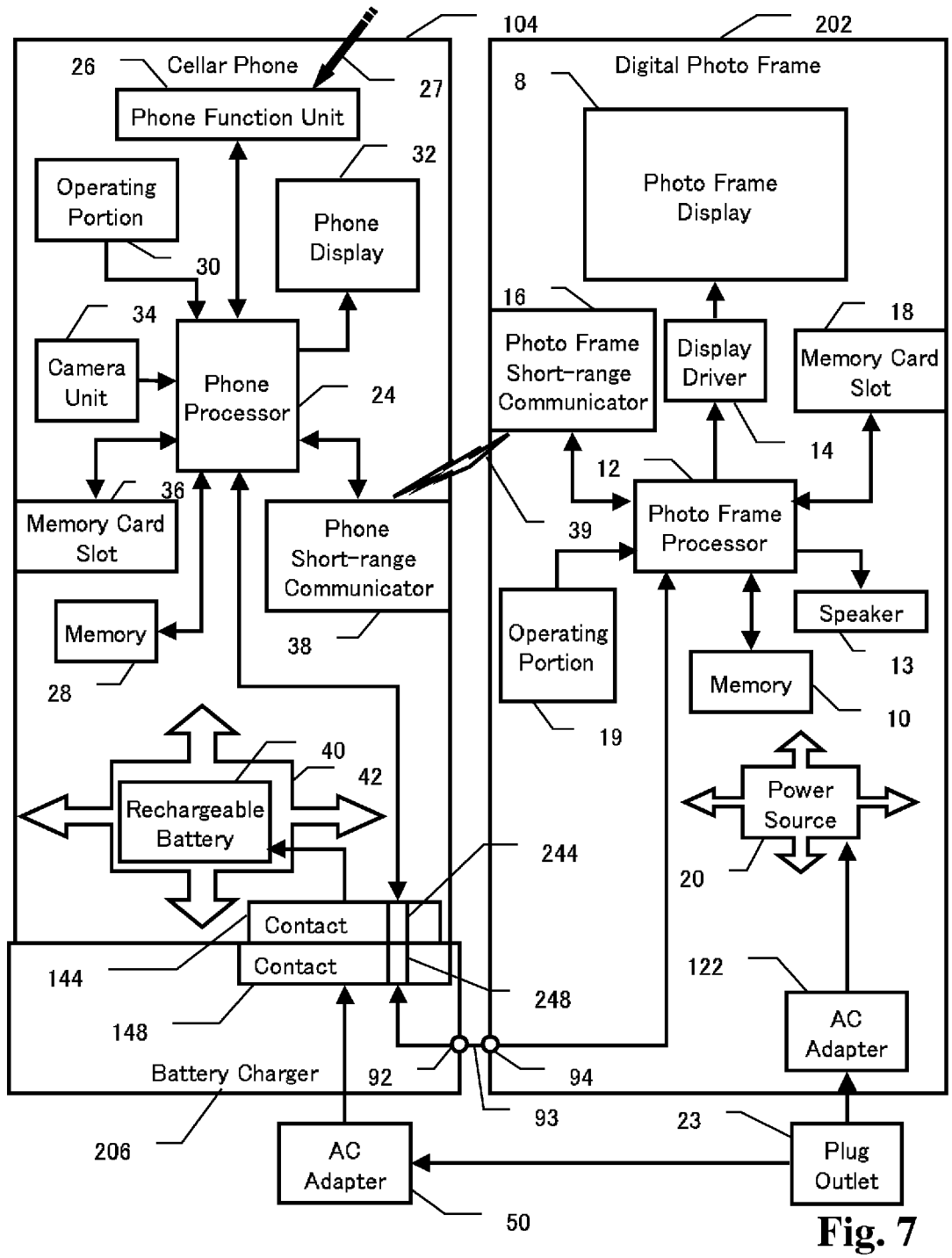
FIG. 7 is a block diagram showing the third embodiment of a digital image viewing system according to this invention.

FIG. 7 is a block diagram showing the third embodiment of a digital image viewing system according to this invention. Since the structure of the third embodiment in FIG. 7 is basically similar to that of the second embodiment in FIG. 4, same reference number is used to denote the same part common to both figures with explanation thereof basically omitted. The third embodiment in FIG. 7 includes digital photo frame 202, cellar phone 104 and battery charger 206 for cellar phone 104.

The third embodiment in FIG. 7 is identical with the second embodiment in FIG. 4 as to the contact structure that contact 144 of cellar phone 104 and contact 148 of battery charger 206 include communication contacts 244 and 248, respectively, for wired transmission of digital image data in addition to the power supply contacts for charging. In other words, digital image data attached to the e-mail received by cellar phone 104 is transmitted from phone processor 24 to photo frame processor 12 by way of communication contacts 244 and 248. However, the third embodiment in FIG. 7 differs from the second embodiment in that digital photo frame 202 and battery charger 206 are not integrated in one body. But, the wired communication is established by connecting communication contact 92 of battery charger 206 and communication contact 94 of digital photo frame 202 with external communication cable 93.

The case of the third embodiment in FIG. 7, digital photo frame 202 is of simple construction with communication contact 94, which can be formed in accordance with the conventional communication standard which can be widely used for connection with other outside devices. In other words, the third embodiment can be simply realized and free from designing a special structure in which digital photo frame and battery charger are integrated into one body as in the second embodiment.

Embodiment 4

Figure 8:
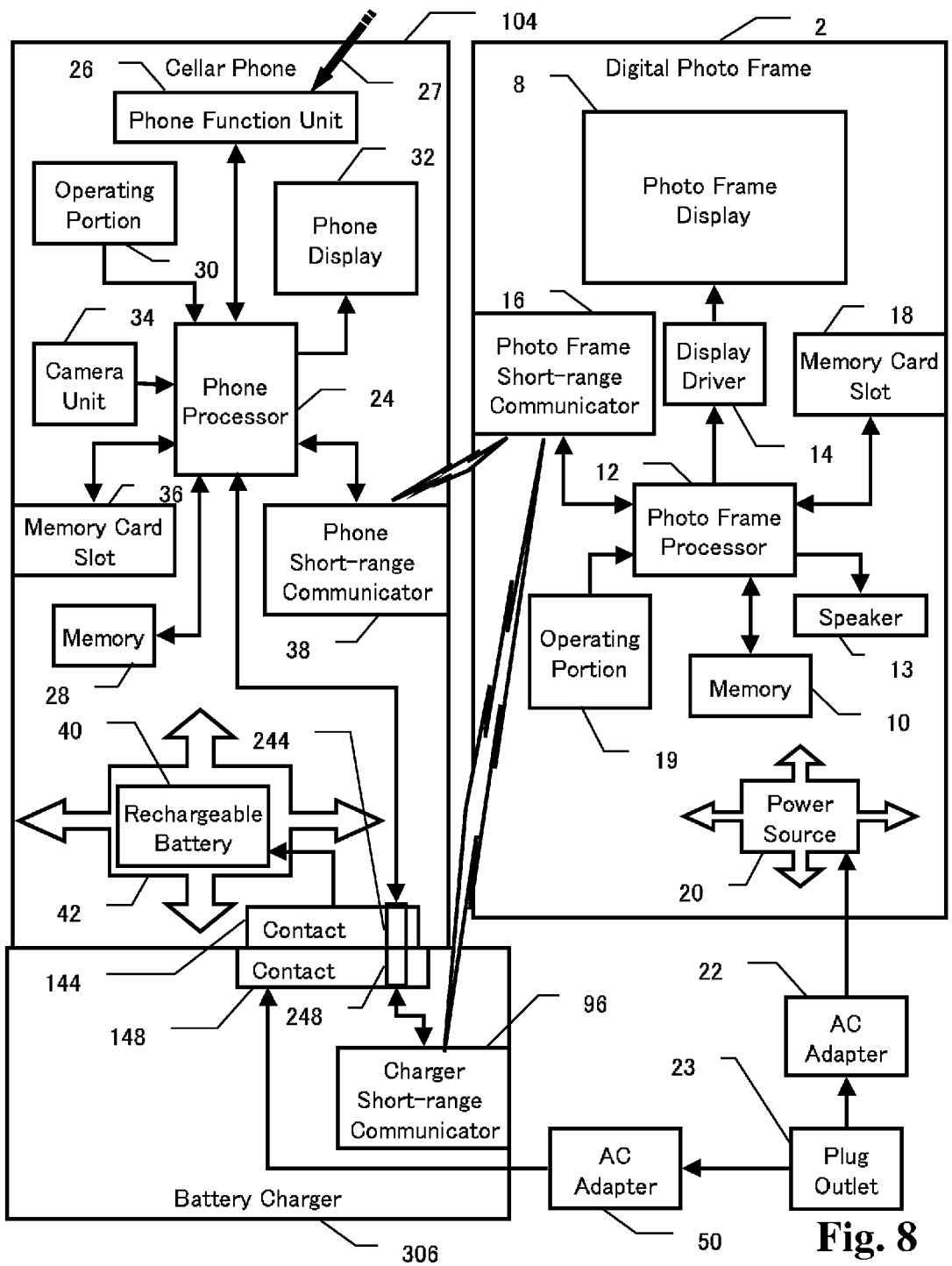
FIG. 8 is a block diagram showing the fourth embodiment of a digital image viewing system according to this invention.

FIG. 8 is a block diagram showing the fourth embodiment of a digital image viewing system according to this invention. Since the structure of the fourth embodiment in FIG. 8 is basically similar to that of the first to third embodiments in FIGS. 1, 4 and 7, same reference number is used to denote the same part common to those figures with explanation thereof basically omitted. The fourth embodiment in FIG. 7 includes digital photo frame 2, cellar phone 104 and battery charger 306 for cellar phone 104.

The third embodiment in FIG. 8 is identical with the third embodiment in FIG. 7 as to the contact structure that contact 144 of cellar phone 104 and contact 148 of battery charger 306 include communication contacts 244 and 248, respectively, for wired communication between cellar phone 104 and battery charger 306. Further, the third embodiment in FIG. 8 is identical with the third embodiment in FIG. 7 in that digital photo frame 2 and battery charger 306 are not integrated in one body. However, the fourth embodiment in FIG. 8 differs from the third embodiment in that battery charger 306 is provided with charger short-range communicator 96 for transmitting the digital image data, which has come from cellar phone 104 through the wired communication, to photo frame short-range communicator 16 by means of the short-range wireless communication.

According to the feature in the fourth embodiment in FIG. 8, path for transmitting digital image data is prepared for a new arrival of e-mail with digital image data attached only by mounting cellar phone 104 on battery charger 302 for the purpose of charging rechargeable battery 40. Cellar phone 104 can still enjoy the above advantage even if cellar phone 104 is modified into such a simplified design that phone short-range wireless communicator 38 is omitted for cost-cutting. Further, battery charger 306 provided with charger short-range wireless communicator 96 in the third embodiment serves as a station for short-range wireless communication in general. In other word, the above mentioned simplified modification of cellar phone 104 without phone short-range wireless communicator 38 becomes capable of short-range wireless communication with other variety of outside devices than digital photo frame 2 during a period in which the modified cellar phone 104 is being mounted on battery charger 306 for charging rechargeable battery 40.

Figure 9:
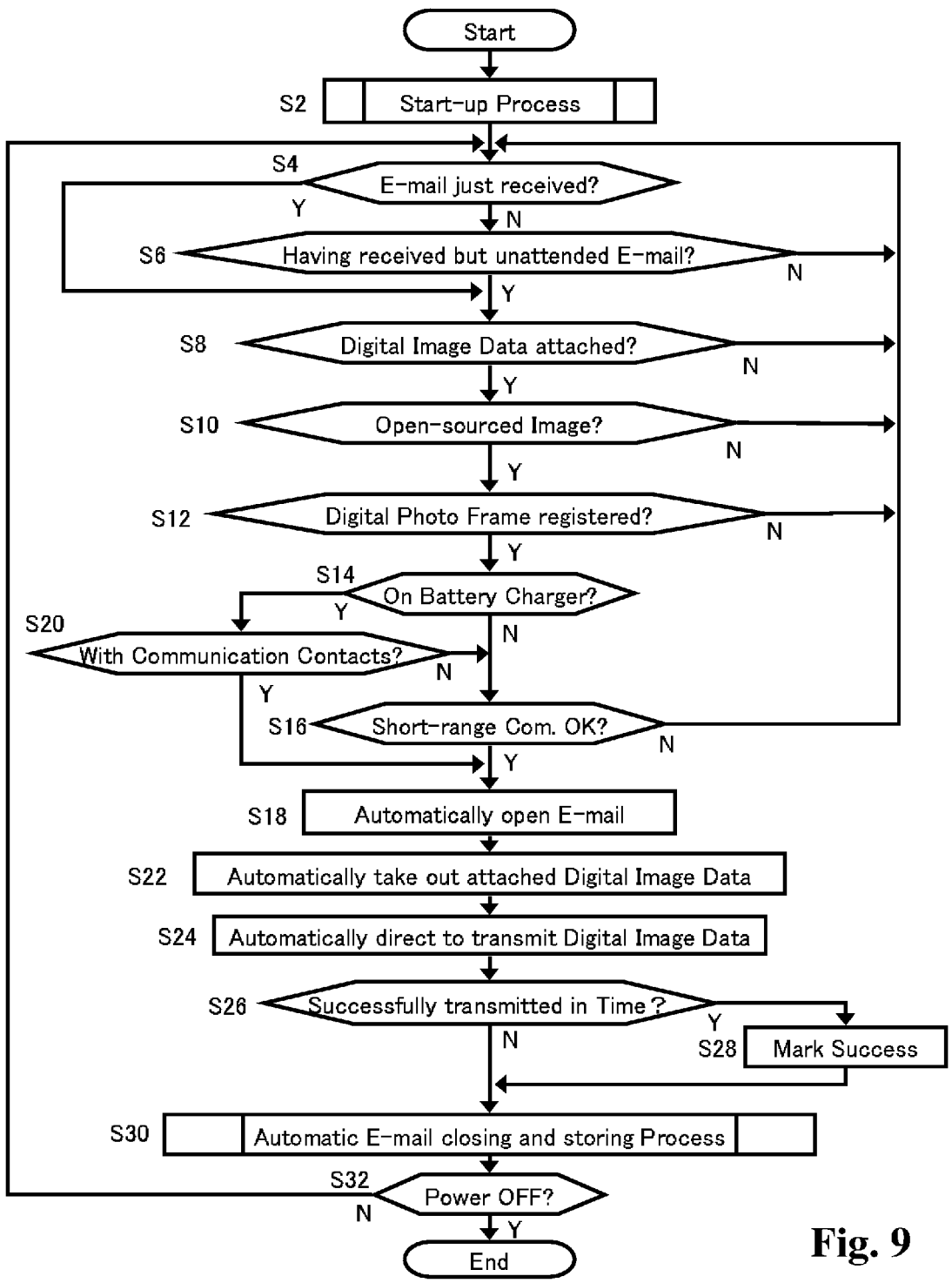
FIG. 9 is a flowchart commonly showing the function carried out by phone processor in the first to fourth embodiments in FIGS. 1, 4, 7 and 8.

FIG. 9 is a flowchart commonly showing the function carried out by phone processor 24 in the first to fourth embodiments in FIGS. 1, 4, 7 and 8. The flowchart in FIG. 9 only refers to functions relating to the receipt of e-mail and transmission of the attached digital image data to digital photo frame 2 or 102 or 202 with other functions including conventional phone functions omitted to show. The flow in FIG. 9 starts when cellar phone 4 or 104 is powered ON to carry out start-up process in step S2 for initializing cellar phone 4 or 104 and making preparation of its function. Next, it is checked in step S4 whether or not cellar phone 4 or 104 just receives a new e-mail.

If it is not determined in step S4 that cellar phone 4 or 104 just receives a new e-mail, the flow goes to step S6 to check whether or not any e-mail which has already received is left unattended with respect to the automatic opening for transmitting the attached e-mail if any to digital photo frame 2 or 102 or 202. If any, the flow goes to step S8. On the other hand, if it is determined in step S4 that cellar phone 4 or 104 just receives a new e-mail, the flow also goes to step S8.

In step S8 it is checked whether or not digital image data is attached to the e-mail. If any, the flow goes to step S10 to check whether or not the digital image data is of open-sourced in which the sender of the digital image data has allowed the receiver to display the digital image. Such allowance or inhibition of display on digital photo frame can be set by the sender at the time when the sender attaches the digital image data to the e-mail. If it is determined in step S10 that the digital image data is of open-sourced, the flow goes to step S12 to check whether or not any IP address of digital photo frame 2 or 102 or 202 or the like is registered as the destination of the digital image data.

If it is determined in step S12 that an IP address of digital photo frame 2 or 102 or 202 or the lake is registered as the destination of the digital image data, the flow goes to step S14 to check whether cellar phone 4 or 104 is mounted on battery charger 6 or 206 or 306 or digital photo frame and battery charger 102. If not, the flow goes to step S16 to check whether cellar phone 4 or 104 is located within the short-range communication area of digital photo frame 2 or 102 or 202. And, if it is determined in step S16 that cellar phone 4 or 104 is located within the short-range communication area of digital photo frame 2 or 102 or 202, the flow goes to step S18. On the other hand, if it is determined in step S14 that cellar phone 4 or 104 is mounted on battery charger 6 or 206 or 306 or digital photo frame and battery charger 102, the flow goes to step S20 to check whether or not the cellar phone is of a type with contact 144 provided with communication contact 144 as in cellar phone 104 and also the battery charger is of a type with contact 148 provided with communication contact 248 as in battery charger 206 or 306 or digital photo frame and battery charger 102. If it is not determined in step S20 that cellar phone is connected to battery charger with communication contacts, the flow goes to step S16 to check the short-range communication capability. On the contrary, if it is determined in step S20 that cellar phone is connected to battery charger with communication contacts, the flow goes to step S18 regardless of the short-range communication capability.

In step S18, the e-mail is automatically opened followed by step S22 to automatically take out the attached digital image data. Next, it is automatically directed in step S24 to transmit the taken-out digital image data to digital photo frame 2 or 102 or 202 by means of available wired or wireless communication. And, it is checked in step S26 whether or not the digital image data has been successfully transmitted to digital photo frame 2 or 102 or 202 within a predetermined time. In the case of transmission success determined in step S26, the flow goes to step S28 to put a mark as the evidence of successful transmission on the e-mil to which the digital image data attached, the flow then going to step S30. On the other hand, if it is not determined within the predetermined time in step S26 that the image data is successfully transmitted, the flow directly goes to step S30 without putting the success mark on the e-mail, which will be regarded as the "unattended e-mail" in step S6.

In step S30, the automatic e-mail closing and storing process is carried out to put back the e-mail to the condition before automatically opened and to store it in memory 28. In other words, the e-mail is put back to the condition before automatically opened through steps S26 and S30 regardless of whether or not the digital image data has been successfully transmitted to digital photo frame 2 or 102 or 202 within a predetermined time. The flow then goes to step S32 to check whether or not the power of cellar phone 4 or 104 is turned OFF to go to the end if the power OFF is detected. On the other hand if it is not detected in step S32 that power is turned OFF, the flow returns to step S4 to wait for a new e-mail. Thus, the flow repeats the loop of steps S4 to S32 unless power OFF is detected in step S32.

If it is not determined in step S6 that any e-mail which has already received is left unattended, or it is not determined in step S8 that any digital image data is attached to the e-mail, or it is not determined in step S10 that any digital image data is of open-sourced, or it is not determined in step S12 that an IP address of any digital photo frame is registered as the destination of the digital image data, or it is not determined in step S16 that cellar phone 4 or 104 is located within the short-range communication area of digital photo frame 2 or 102 or 202, the flow in each case returns to step S4 to prepare for any change in situation.

Figure 10:
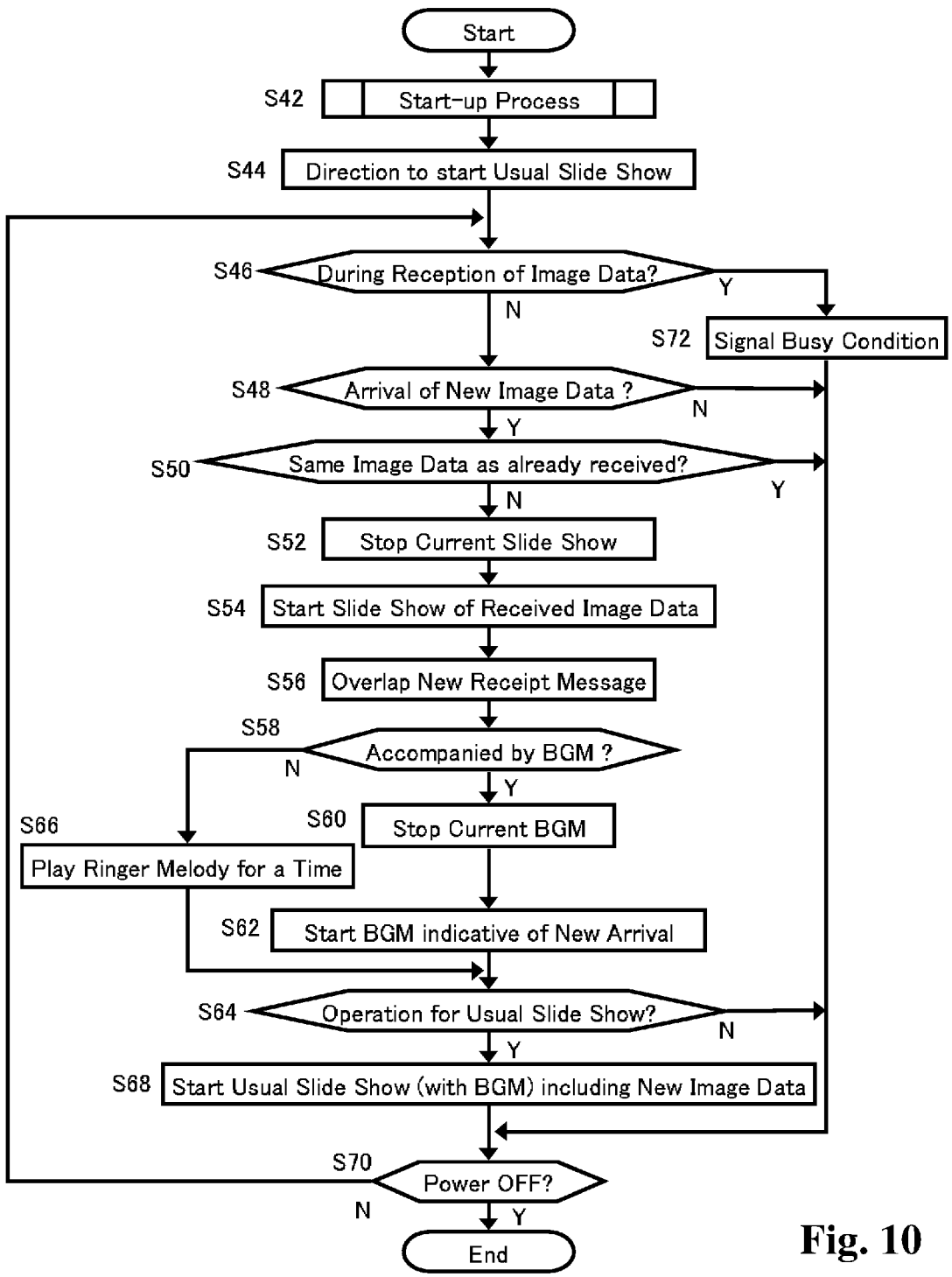
FIG. 10 is a flowchart commonly showing the function carried out by photo frame processor in the first to fourth embodiments in FIGS. 1, 4, 7 and 8.

FIG. 10 is a flowchart commonly showing the function carried out by photo frame processor 12 in the first to fourth embodiments in FIGS. 1, 4, 7 and 8. Similarly to the case of FIG. 9, the flowchart in FIG. 10 only refers to functions relating to the management of new image data transmitted from cellar phone 4 or 104 with other functions including conventional photo frame functions omitted to show. The flow in FIG. 10 starts when digital photo frame 2 or 102 or 202 is powered ON to carry out start-up process in step S42 for initializing digital photo frame 2 or 102 or 202 and for making preparation of its function. Next, in step S44 a direction is made to start a usual slide show as in conventional digital photo frames.

The "usual slide show" above means a slide show which is carried out in accordance with a conventional setting on the basis of digital image data stored in memory 10 or in the removable storage medium inserted into memory card slot 18. A typical conventional setting for the usual slide show includes a selection of digital image data joining the slide show, a setting for order of image appearing on photo frame display 8 and a setting for background music to or not to accompany the slide show and selection of background music if necessary. The "usual slide show" also means in the simplest case that a single image data continues to appear on photo frame display 8 without any substitution by another image data.

With the slide show started by step S44, the flow advances to step S46 to check whether or not it is during reception of image data. If not, the flow goes to step 48 to check whether or not a new image data arrives. If arrival of new image data is detected in step S48, the flow advances to step S50 to check whether or not the new image data is the same as an image data which has been already received. If not, the flow goes to step S52 to stop current slide show, and in place of the current slide show, a slide show of the received new image data starts in step S54.

Further, in step S56, characters as "New !", which is the message indicative of the arrival of new image data, is superimposed on the new image data on photo frame display 8. Nest in step S58, it is checked whether or not the stopped slide show has been carried out with a background music accompanying. If it is determined in step S58 that the stopped slide show has been accompanied by usual background music, the background music is stopped in step S60, and, in place of the background music, special background music indicative of the arrival of new image data, the flow then going to step S64. The play of the special background music continues unless an predetermined operation is made, which is explained later in respect to step S64.

On the other hand, if it is not determined in step S58 that the stopped slide show has been accompanied by usual background music, the flow goes to step S66 to direct playing a ringer melody which continues for a time and automatically stops, the flow then going to step S64. In any case regardless of the check in step S58, some notifying music such as special background music or ringer melody accompanies the slide show at least in the beginning for aurally notifying the arrival of new image data in addition to the visual notification by the superimposition on the display.

In step S64 it is checked whether or not an operation directing to return to the usual slide show is made. In other words, it is assumed that a user noticing the arrival of the new image data may make the operation at operating portion 30 to stop the slide show exclusively for the new image data, which operation is to be detected in step S64. If the operation for usual slide show is detected is step S64, the flow goes to step S68 for directing to start the usual slide show including the newly received image data. In step S68, the special background music or ringer melody is stopped and usual background music comebacks if the slide show is set to be accompanied by background music.

Next to the direction in step S68, it is checked in step S70 whether or not a power off operation is made. By the way, if it is not detected in step S64 that an operation directing to return to the usual slide show is made. On the other hand, if the condition during reception of image data is detected in step S46, the flow goes to step S72 to signal the neighboring cellar phones or the like of the busy condition of the digital photo frame, the flow then going to step S70. The busy signal is continued as long as the digital photo frame is receiving image data. Thus, if the digital photo frame is in the course of receiving image data form a first cellar phone, a second cellar phone cannot transmit its image data and waits ready until busy signal will stop with the image data transmission from the first cellar phone completed. After the busy condition signaling is started in step S72 the flow goes to step S70. Further, if arrival of new image data is not detected in step S48, or if it is detected in step S52 that the new image data is the same as an image data which has been already received, the flow instantly goes to step S70.

If the power of operation is detected in step S70, the flow of FIG. 10 ends. On the other hand, if the power off operation is not detected in step S70, the flow returns to step S46 to repeat steps S46 to S70. In other words, the repetition of steps S46 to S70 is to continue data receiving function if during reception of image data, or to wait for and respond to an arrival of new image data if not during reception of image data.

The various features according to the present invention are not only applicable to the embodiments explained above, but also to other types of embodiments. For example, the features of digital photo frame shown in FIG. 10 are applicable to a type of digital photo frame having the phone function unit according to the cellar phone system capable of receiving by itself an e-mail to which digital image data is attached. In this case, the digital photo frame can directly receive image data from a cellar phone far away, as well as receiving image data from a neighboring cellar phone by means of wired communication or short-range wireless communication.

What is claimed is:

1. A digital image viewing system comprising:
    a plurality of wireless phone units each including a phone short-range wireless communicator to transmit digital image data, an operating portion, a phone display cooperating with the operating portion for operations and displays relating to various phone functions, and a rechargeable battery to power the wireless phone unit; and
    a digital photo frame registered by the plurality of wireless phone units as a destination of the digital image data, the digital photo frame including a memory arranged to store digital image data, a photo frame display, a controller arranged to play usual slide show on the display on the basis of the digital image data stored in the memory, a photo frame short-range wireless communicator in communication with the phone short-range wireless communicator to receive the digital image data from the plurality of wireless phone units, and an identifier of the digital image data received from different ones of the plurality of wireless phone units,
    wherein the controller is arranged to compare the digital image data received from one of the plurality of wireless phone units with the digital image data received from another of the plurality of wireless phone units on the basis of the identifier, and
    wherein the controller is further arranged to change the image display on the photo frame display in response to the photo frame short-range wireless communicator in communication with the phone short-range wireless communicator, and wherein the controller is arranged not to change the image display on the photo frame display if the controller detects that the digital image data received from one of the plurality of wireless phone units is identical with the digital image data received from another of the plurality of wireless phone units.

2. The digital image viewing system according to claim 1, wherein the digital photo frame further includes a speaker, and wherein the controller of the digital photo frame is arranged to replace the usual slide show with a special image when the speaker plays a ringer melody on the speaker.

3. The digital image viewing system according to claim 2, wherein the controller is further arranged to superimpose a message on the special image when the speaker plays the ringer melody.

4. The digital image viewing system according to claim 2, wherein the controller is further arranged to have the usual slide show accompanied by background music played on the speaker and to stop the background music when the speaker plays the ringer melody.

5. The digital image viewing system according to claim 2, wherein the special image is relating to the ringer melody.

6. The digital image viewing system according to claim 5, wherein the special image is relating to a person causing the ringer melody.

7. The digital image viewing system according to claim 1, wherein the phone short-range communicator is arranged to transmit an operation at the operating portion to the digital photo frame by way of the photo frame short-range wireless communicator to change the display on the photo frame.

8. The digital image viewing system according to claim 1, wherein the digital photo frame further includes a phone function unit.

9. The digital image viewing system according to claim 1, wherein each of the wireless phone units further includes a phone function unit.

10. The digital image viewing system according to claim 9, wherein each of the wireless phone units is a cellar phone, wherein the phone function unit is capable of receiving an e-mail with digital image data attached, wherein the cellar phone includes a mail controller arranged to automatically open the received e-mail to automatically take out and transmit the attached digital image data to the digital photo frame by means of the phone short-range wireless communicator.

11. The digital image viewing system according to claim 10, wherein the mail controller is arranged not to automatically take out the attached digital image data in response to the checker if the digital image data is inhibited by the sender from being transmitted for display.

12. The digital image viewing system according to claim 1, wherein the controller is arranged to change the usual slide show into a special image in response to the photo frame short-range wireless communicator in communication with the phone short-range wireless communicator.

13. The digital image viewing system according to claim 12, wherein the special image is the digital image data received from one of the plurality of wireless phone units by means of the photo frame short-range wireless communicator.

* * * * *